United States Patent
Mueller

(10) Patent No.: US 10,185,392 B2
(45) Date of Patent: Jan. 22, 2019

(54) METHOD FOR TRANSMITTING INFORMATION TO A DRIVER OF A MOTOR VEHICLE, AND ADAPTIVE DRIVER ASSISTANCE SYSTEM

(71) Applicant: Robert Bosch GmbH, Stuttgart (DE)

(72) Inventor: Alexander Mueller, Bietigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 112 days.

(21) Appl. No.: 15/293,600

(22) Filed: Oct. 14, 2016

(65) Prior Publication Data
US 2017/0108925 A1    Apr. 20, 2017

(30) Foreign Application Priority Data

Oct. 20, 2015 (DE) .................. 10 2015 220 398

(51) Int. Cl.
| | |
|---|---|
| *B60W 40/08* | (2012.01) |
| *G06F 3/01* | (2006.01) |
| *G06F 3/16* | (2006.01) |
| *G09G 5/00* | (2006.01) |
| *G06F 3/147* | (2006.01) |

(52) U.S. Cl.
CPC ............ *G06F 3/013* (2013.01); *B60W 40/08* (2013.01); *G06F 3/016* (2013.01); *G06F 3/147* (2013.01); *G06F 3/16* (2013.01); *G09G 5/006* (2013.01); *G09G 2320/0261* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 8,957,847 | B1* | 2/2015 | Karakotsios | G06F 3/013 345/156 |
| 9,526,127 | B1* | 12/2016 | Taubman | H04W 88/02 |
| 2007/0164990 | A1* | 7/2007 | Bjorklund | G06F 3/017 345/156 |
| 2009/0022368 | A1* | 1/2009 | Matsuoka | B60K 35/00 382/103 |
| 2012/0271484 | A1 | 10/2012 | Feit et al. | |
| 2012/0300061 | A1* | 11/2012 | Osman | G06F 1/3231 348/135 |
| 2015/0015479 | A1* | 1/2015 | Cho | G06F 3/013 345/156 |
| 2016/0009411 | A1* | 1/2016 | Davalos | B64D 47/02 345/156 |
| 2017/0060130 | A1* | 3/2017 | Kim | H04W 40/244 |

FOREIGN PATENT DOCUMENTS

| | | |
|---|---|---|
| EP | 2325722 A1 | 5/2011 |
| GB | 2500690 A | 10/2013 |

* cited by examiner

*Primary Examiner* — Kent Chang
*Assistant Examiner* — Benjamin Morales Fernandez
(74) *Attorney, Agent, or Firm* — Norton Rose Fulbright US LLP; Gerard Messina

(57) ABSTRACT

A method for transmitting information to a driver of a motor vehicle, with at least two information channels being provided to transmit information, includes presenting the information via at least a first information channel for the driver, determining a perception quantity representing perception by the driver with regard to the information presented, and defining a transmission of the information via a further information channel on the basis of the perception quantity determined.

19 Claims, 3 Drawing Sheets

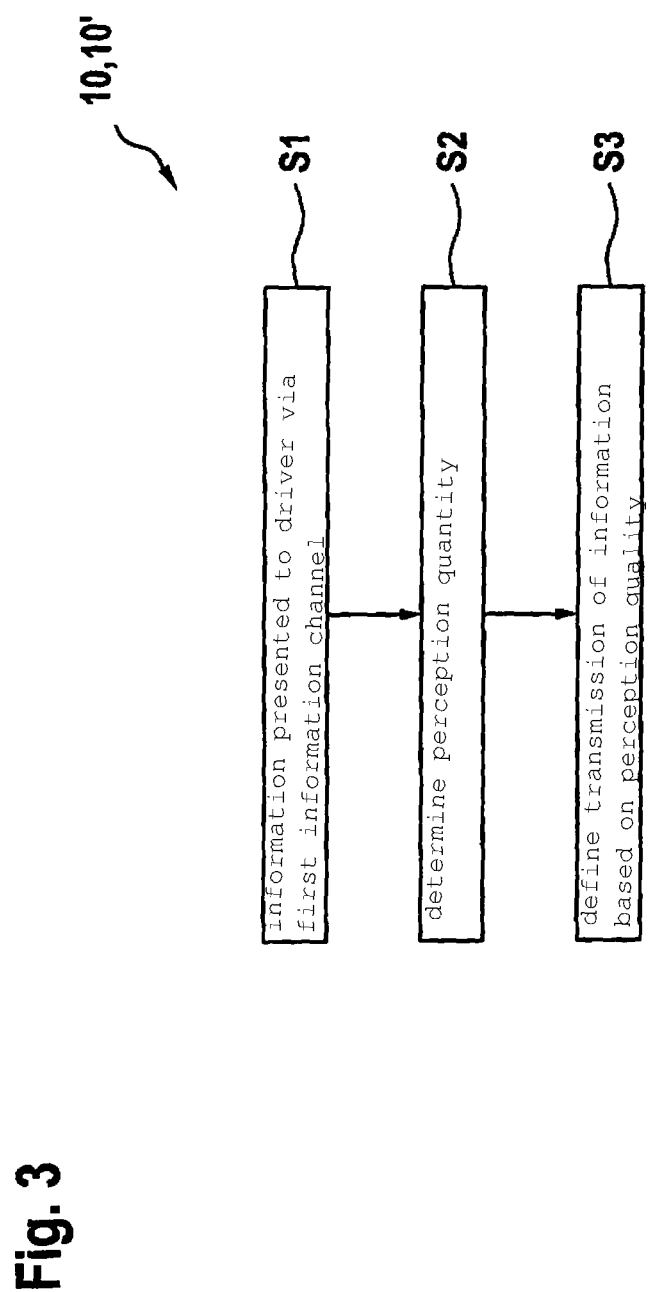

METHOD FOR TRANSMITTING INFORMATION TO A DRIVER OF A MOTOR VEHICLE, AND ADAPTIVE DRIVER ASSISTANCE SYSTEM

CROSS REFERENCE

The present application claims the benefit under 35 U.S.C. § 119 of German Patent Application No. DE 102015220398.0 filed on Oct. 20, 2015, which is expressly incorporated herein by reference in its entirety.

FIELD

The present invention relates to a method for transmitting information to a driver of a motor vehicle, at least two information channels being provided to transmit information. The present invention also relates to an apparatus and a computer program that is equipped to carry out the method, as well as a machine-readable storage medium on which the computer program is stored.

BACKGROUND INFORMATION

Eye-tracking systems are available in the related art. Eye-tracking refers to the recording of the eye movements of a person made up primarily of fixations (points which are looked at specifically), saccades (rapid eye movements) and regressions. Devices and systems are referred to as "eye tracker" which carry out this recording and permit an analysis of the eye movements and viewing direction. Modern eye trackers are made of short-range infrared cameras that produce reflections on the retina using a lighting unit. The calibrated positions of pupil and reflections allow a precise identification of the viewing direction of the driver. FIG. 1 shows a schematic model for calibrating such a system. Here, different positions of a pupil with reflections are indicated by A. C indicates a lighting unit for illuminating the pupil. B indicates a camera system for photographing the pupil and the reflections. D represents a visual focus field. In this case, the specific pupil position and reflection are photographed with the camera for different image points on the focus field. Based on this data, the different image points and pupil positions are allocated with the aid of a transfer function E. From this, the correspondingly viewed image points may be determined for future pupil positions.

European Patent Application No. 2 325 722 A describes a method for modulating an operation of a device, including:
Mounting a hardware sensor in or on the device to sense the attentiveness of a user as related to the device;
Processing a signal of the hardware sensor and outputting a coefficient or an index of the attentiveness of the user with regard to the device; and
Adapting the operation of the device on the basis of the coefficient or the index of the attentiveness of the user with respect to the device;
the adaptation being initiated by the device and including an alert and/or information and/or communication to the user based on the attentiveness of the user with respect to the device.

SUMMARY

A method in accordance with the present invention may advantageously permit information to be presented in a manner adapted to the actual present need of the driver for information. Such an adaptive conveyance of information advantageously factors in whether or not the driver has already perceived the information.

A method in accordance with the present invention for transmitting information to a driver of a motor vehicle, with at least two information channels being provided to transmit information, includes:
Presenting the information via at least a first information channel for the driver,
Determining a perception quantity representing perception by the driver with regard to the information presented,
Defining a transmission of the information via a further information channel on the basis of the perception quantity determined.

By this is understood that, advantageously, information may be transmitted in a manner adapted to the actual need of the driver. This may also be referred to as adaptive information transmission. For this, first of all, the pertinent information is provided to the driver via, i.e., with the aid of a first information channel. An information channel may be understood as any type of offering and conveyance of information. The potential information channels are defined via the sensory perception possibilities of the driver. Therefore, visual, auditory, haptic or even olfactory channels and more are possible. Naturally, however, the information channels actually usable are limited by the technical devices available in the vehicle. In this context, an information channel is realized in practice with the aid of an information-transmitting location. For example, the information may be presented visually by a display. Displays already installed in the vehicle, such as the instrument cluster or the display of the center console or perhaps a head-up display may be used advantageously for this purpose.

As indicated, the presentation of the information with the aid of the first information channel may take place via one of these information channels. In addition, the information may, of course, also be presented via several channels. Due to the technical realization of the channels with the use of information-transmitting locations, different information channels may differ both with respect to their sensory perception—e.g., visual (display) and auditory (loudspeaker)—and with respect to their structural implementation—e.g., two displays as two different visual information channels.

Furthermore, according to the method of the present invention, advantageously, it is checked whether the driver has perceived or is perceiving the information presented. For this purpose, a perception quantity representing the perception is determined and analyzed. Various approaches present themselves for determining whether the information provided is being perceived. For example, in doing this, a focusing of the driver on the information presentation, e.g., the viewing direction and length of time the gaze stays on a visual presentation may be analyzed. Alternatively or additionally, a reaction of the driver may also be observed and analyzed, that is, whether he performs an action that indicates perception of the information presented. In the course of assessing the perception, both a positive perception and a lack of perception by the driver may be recognized.

Transmission of the information via a further information channel may be defined on the basis of the estimated perception. In this context, for example, in response to a recognized lack of perception, the definition of the transmission may provide a presentation and possibly an amplification of the presentation of the information with the aid of a further information channel. It may thereby advantageously be ensured that the driver perceives the pertinent information. However, for example, in the event positive perception is detected, the definition of the transmission may also provide an omission or possibly a reduction or deactivation of an additional presentation. In this way, presentation of redundant information may advantageously be reduced or even avoided. Redundant information is to be understood as information which is presented again to the driver, even though it has already been perceived by the driver, that is, the driver is aware of it.

The definition of the transmission may also include the step of implementing the definition of the transmission, i.e., effectuating the transmission of the information via the further information channel. Alternatively, this step may advantageously follow the definition step. The actual presentation of the information is thereby realized via the further information channel, and in this manner, transmission of the information to the driver is optimized and finalized.

The term "transmission of the information" is to be understood such that, in particular, it concerns the same information which is to be transmitted to the driver, adapted to the respective information channel, if applicable. Therefore, the perception, or the perception quantity representing the perception of the driver, may also be understood as perception with regard to the information transmitted via the first information channel.

In one advantageous specific embodiment, the method is characterized in that the first information channel is in the form of a first visual information-transmitting location.

By this is understood that in the course of the first step of the method, the information is presented by conveying it visually. In this case, displays may be used advantageously. In addition to the instrument cluster, it is also possible, for example, to employ head-up displays or displays which are positioned in or around the center console. In this context, the visual information-transmitting location permits a unidirectional flow of information. Of course, displays may also be used which permit a bidirectional flow of information, for example, what are referred to as touch displays. In additional or alternative embodiments, auditory or haptic information-transmitting locations may also be used as first information channel.

In one preferred further refinement, the method is characterized in that the further information channel takes the form of
  an auditory information-transmitting location and/or
  a second visual information-transmitting location and/or
  a haptic information-transmitting location.

The term "further information channel" is to be understood in connection with step 3 of the method, in which transmission of the information via a further information channel is defined on the basis of the ascertained perception. The further refinement described is to be understood in such a way that the definition of the transmission of the information is carried out advantageously with the aid of an auditory information-transmitting location, e.g., a loudspeaker. In one advantageous alternative, the further information channel may likewise take the form of a visual information-transmitting location, e.g., a further display. In an alternative specific embodiment, the further information channel for transmitting the information is in the form of a haptic information-transmitting location. Components with which the driver is in contact, e.g., the steering wheel, the brake pedal or accelerator pedal as well as the driver's seat are especially suited as haptic information-transmitting location. For example, a predefined steering movement or independent movement of the brake pedal may transmit information to the driver.

In one advantageous specific embodiment, the method is characterized in that, if the perception quantity represents perception of the information by the driver, the definition of the transmission of the information via the further information channel includes at least one of the following steps:
  Omitting transmission of the information via a further information channel and/or
  adapting a transmission of the information via a further information channel, in particular, the presentation of the information being attenuated.

By this is understood that when, in the course of assessing the perception, a positive, i.e., actual perception by the driver is ascertained, one of the indicated steps is carried out. These steps may be understood as definition and implementation of the transmission of information via the further information channel. Here, it is provided that no transmission of information is carried out via a further information channel. Should a presentation via a further information channel already exist, alternatively, the transmission via this information channel may also be adapted. In this event, the presentation may advantageously be attenuated. For instance, in the case of visual displays, this may be accomplished by a change in the colors, a darkening of the display, or a (semi-) transparency of the elements shown. Consequently, on the basis of the perception quantity, the method advantageously makes it possible to determine redundant information and to omit transmission of the redundant information via a further information channel and/or to adapt transmission of the redundant information via a further information channel, in particular, the presentation of the redundant information being attenuated. Redundant information is to be understood as duplicated information which was already perceived by the driver and/or is known to the driver. Naturally, the redundancy is not limited to one specific information channel, that is, also if the same information is presented via different information channels, a redundancy may occur as soon as the driver has perceived the information. Presentation of already perceived, that is, redundant information via a further information channel is superfluous. By avoiding the presentation of such information, the abundance of information for the driver may be reduced. In addition, distraction of the driver owing to further information is thereby advantageously reduced. It is also possible that as a result of this, new functions may attain greater user acceptance. A further advantage becomes apparent in the energy saving in the case of electrical display units—they are only switched on or switched to full brightness when the presentation of the information is actually necessary for the driver, since the driver has not yet perceived it. Moreover, disturbing light sources and reflections by display units in a vehicle are avoided, especially when driving at night.

In an alternative advantageous specific embodiment, the method is characterized in that if the perception quantity represents no perception of the information by the driver, the definition of the transmission of the information via the further information channel includes at least one of the following steps:
  Transmitting the information via a further information channel and/or
  Adapting the transmission of the information via a further information channel, in particular, a presentation of the information being amplified.

By this is understood that when, in the course of assessing the perception, a negative, i.e., no perception by the driver is ascertained, one of the indicated steps is carried out. In this case, the information is additionally transmitted via a further information channel. Should a presentation via a further information channel already exist, alternatively, the transmission via this information channel may also be adapted. In so doing, for example, the presentation may advantageously be amplified. For instance, in the case of visual displays, this may be accomplished by a change in colors, brightening of the presentation, stronger contrasts or other visual effects, e.g., blinking of the elements shown. For auditory presentations, advantageously, a repetition and/or an increase in volume may be provided. Furthermore, it should be noted that the terms "no perception" and "perception" relate especially to the perception by the driver as a result of the transmission via the at least first information channel.

In one preferred development, the method is characterized in that at least one of the following factors is taken into account in ascertaining the perception quantity:
a viewing direction of the driver and/or
an action by the driver.

By this is understood that the perception may be ascertained separately from an active confirmation by the driver. For example, such a confirmation could be effected by a spoken comment or by pressing a confirmation button. The advantage of avoiding such an active confirmation is that distraction of the driver as well as manual actions by the driver may be reduced. An indirect ascertainment of the perception of presented information may therefore reduce the burden on the driver and increase safety in the guidance of the vehicle. For instance, an anticipated perception may be determined indirectly by way of the viewing direction of the driver. In particular, this may be employed advantageously for visual information-transmitting locations, e.g., the viewing direction having to be toward the information presented at the information interface. For instance, the viewing direction may be determined by use of a passenger-compartment camera and conventional eye-tracking methods. For example, if the driver is looking at visual information represented with the aid of the first information channel, in an assessment, it may be assumed the information is perceived.

In an alternative embodiment, a probable perception may be ascertained indirectly, e.g., by observing and analyzing the behavior and the actions of the driver. If, within a defined time span after presentation of information, an action is performed which may be judged as reaction to the transmitted information, in a first estimation, this may be viewed as proof of the perception. For example, within the framework of a navigation, the following actions should be seen for the information "upcoming change of direction": Getting into a suitable lane for turning off, setting the turn signals, glancing over one's shoulder, etc.

In one advantageous further refinement, the method is characterized in that the visual perception is modeled in order to determine the perception quantity, in so doing, a gaze dwell time especially being taken into account.

By this, it is understood that algorithms for modeling visual attentiveness with regard to objects may be used expediently within the scope of the method. For example, such algorithms run on a control device. In this case, the perception may be assessed, for instance, by the viewing direction and the dwell time of the gaze. Here, the measurement of the gaze dwell time relates especially to so-called ROI (Regions Of Interest), e.g., the positions at which the relevant information is displayed. From this, it becomes clear that the gaze dwell time relates to the length of time the driver looks in a specific direction or at a specific point. In this connection, for instance, a dwell time of greater than or equal to 1 second may point to an attentive user. This correspondent presented information could thus be taken as "perceived."

In one possible embodiment, the method is characterized in that the perception quantity is determined with the aid of a passenger-compartment sensor system, especially by use of a passenger-compartment camera.

By this is understood that, for example, a passenger-compartment camera is employed within the context of the method. This camera makes it possible to photograph at least parts of the driver, especially his face and his eyes. In other words, with the aid of a passenger-compartment sensor system (e.g., a driver-observation camera for eye tracking), it is possible to recognize the turning of the driver's eyes (=visual attentiveness) toward objects and/or displays, and to suppress or to amplify auditory and/or visual and/or haptic indications through a human-machine interface accordingly.

Two examples are explained as illustration:
Navigation system has planned a route—in 100 m driver should turn right. Driver looks at route description, which is shown on the display of the navigation system. A separate audio output of the route description ("turn right now") is suppressed, since the driver has demonstrated his visual attentiveness by turning his eye toward the display.
Driver is looking continuously at the speed reading in the HUD (head-up display). He has not looked at the speed reading in the instrument cluster any more for a considerable time. Therefore, the display in the instrument cluster is darkened step-by-step, and is only brightened again when the driver looks explicitly at the instrument cluster.

The method, also provided according to the present invention, for controlling a driver assistance system, including transmission of information to a driver of a motor vehicle, with at least two information channels being provided for transmitting information, is characterized in that, using the method described above
information is presented via at least a first information channel for the driver,
a perception quantity representing perception by the driver with regard to the information presented is determined, and
transmission of the information via a further information channel is defined on the basis of the perception quantity determined.

By this, a driver assistance system is to be understood through which, by using the method described, transmission of unperceived information to the driver may be supported and transmission of redundant information may be avoided.

In addition, according to the present invention, an apparatus is provided which has means and is furnished to carry out the method. For example, an apparatus for a driver assistance system for implementing the method described may be regarded as apparatus. Furthermore, for instance, a passenger-compartment camera for implementing the method described may be regarded as apparatus.

For example, the method may be implemented in software or hardware or in a mixed form of software and hardware, e.g., in a control unit. The approach presented here also provides an apparatus which is designed to carry out, control or implement the steps of a variant of a method presented here in suitable devices. The object of the present invention may be achieved quickly and efficiently by this embodiment variant of the invention in the form of an apparatus, as well.

In the present case, such an apparatus may be understood to be an electrical device that processes sensor signals and outputs control signals and/or data signals as a function thereof. The apparatus may have an interface which may be implemented in hardware and/or software. In the case of a hardware implementation, the interfaces may be part of what is termed a system ASIC, for example, that includes a wide variety of functions of the apparatus. However, it is also possible for the interfaces to be separate, integrated circuits or to be made up at least partially of discrete components. In the case of a software implementation, the interfaces may be software modules which, for example, are available in a microcontroller in addition to other software modules.

Also of advantage is a computer-program product or computer program having program code that may be stored on a machine-readable carrier or storage medium such as a semiconductor memory, a hard-disk storage or an optical memory, and is used to carry out, implement and/or control the steps of the method according to one of the previously described specific embodiments, especially when the program product or program is executed on a computer or a device.

It should be pointed out that the features specified individually in the description may be combined with each other in any technically useful manner, and reveal further embodiments of the present invention. Additional features and functionality of the present invention are derived from the description of exemplary embodiments with reference to the accompanying figures.

BRIEF DESCRIPTION OF THE DRAWINGS

FIG. 3 shows a schematic flow chart of the steps of the method.

DETAILED DESCRIPTION OF EXAMPLE EMBODIMENTS

Figure 1:
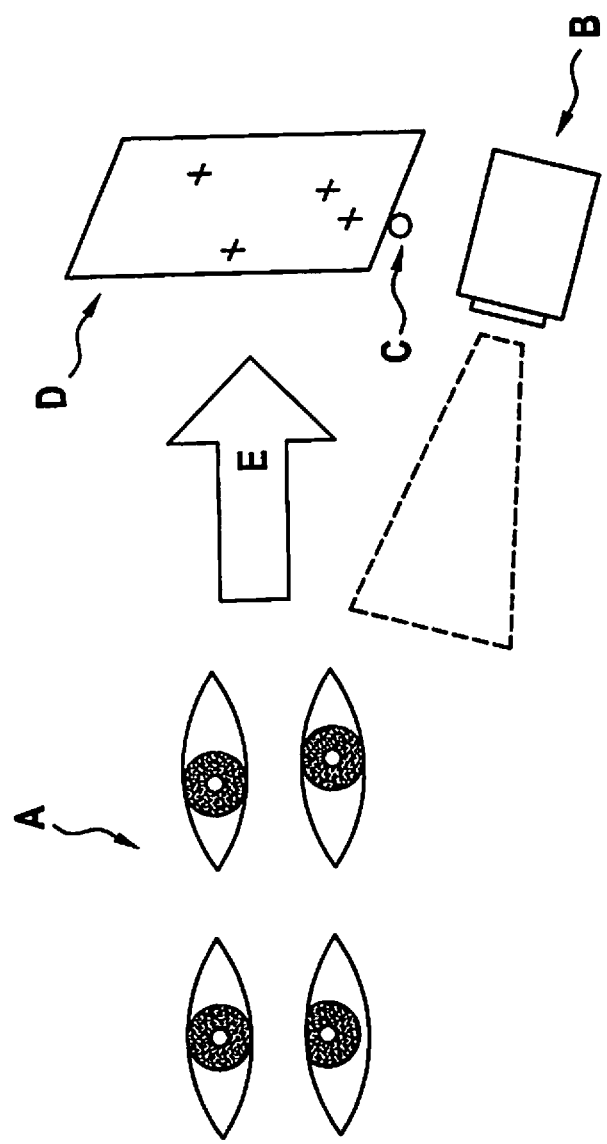
FIG. 1 shows a schematic model for calibrating an eye-tracking system.

FIG. 1 shows a schematic model for calibrating an eye-tracking system. A description of this calibration as well as of the technology of eye tracking is found in the remarks concerning the related art.

Figure 2:
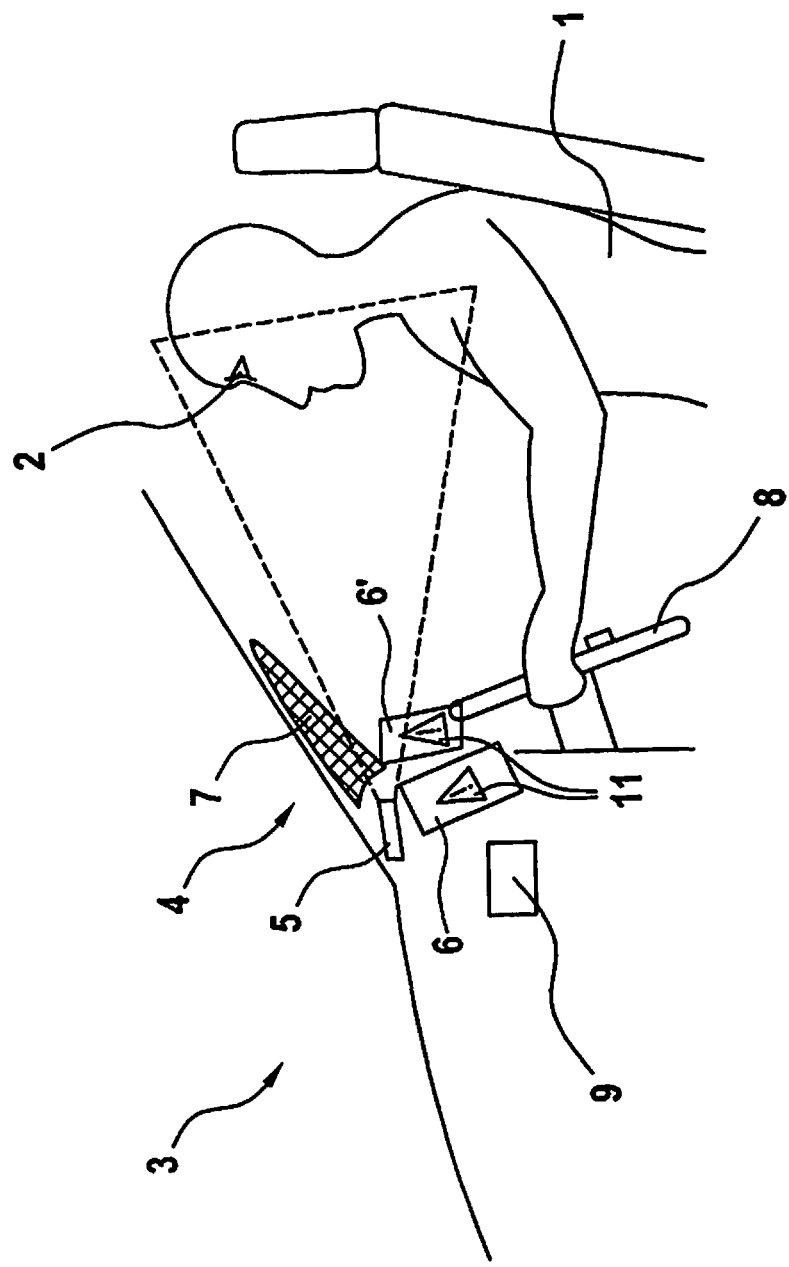
FIG. 2 shows a schematic section of a driver in a motor vehicle in the case of one embodiment of the method.

FIG. 2 shows a schematic section of a driver 1 in a motor vehicle 3 in the case of one embodiment of method 10 or 10'. Here, driver 1 is positioned in a seating posture in vehicle 3. Vehicle 3 also contains a driver assistance system 4. In the exemplary embodiment, it is in the form of a navigation instrument. According to method 10 or 10', information 11 is transmitted to the driver via a first information channel. In the exemplary embodiment, this information channel is implemented as a visual information channel employing a display 6. For example, the display of the center console, a display of the instrument cluster or a separate display is used as display 6.

Eyes 2 of driver 1 are monitored by a passenger-compartment sensor system 5. This passenger-compartment sensor system 5 is in the form of a camera having active infrared lighting for determining the viewing direction ("eye tracking"). View vectors and the eye position may thereby be ascertained. By using eye-tracking methods, it is possible to check where driver 1 is looking and which elements driver 1 is observing. In this manner, for example, it may be checked whether driver 1 has looked at information 11 displayed visually with the aid of an HMI (human-machine interface) driver display 6. In addition, it is assessed whether driver 1 has perceived information 11. Among other things, the period of time the information is observed will be taken into account for this.

Moreover, a further information channel is provided. In the exemplary embodiment, it is in the form of an auditory information channel employing loudspeaker 7 of the vehicle. Depending on the perception by driver 1 of information 11 transmitted via the first information channel, i.e., display 6, transmission of information 11 via a second information channel is defined and implemented. For example, if, on the basis of the data ascertained by use of the eye tracking, it cannot be assumed that the driver has perceived information 11 displayed on display 6, a further offering of information 11 may be carried out via the auditory path through loudspeaker 7 by voice output to driver 1. However, if it is determined that driver 1 is already perceiving information 11 during a presentation via display 6, an additional auditory presentation of the information with the aid of loudspeaker 7 may be omitted.

Furthermore, an additional information channel is provided. In the exemplary embodiment, it is represented as a haptic information channel with the aid of a further information interface 8 which, for example, takes the form of a steering-wheel vibration and/or a steering-wheel motion. Likewise, information is only offered via this path if the evaluation of the data suggests that driver 1 has not perceived information 11 presented on the display.

In addition, a further visual information interface 6' is represented by a further display. For example, if it is determined that driver 1 has not perceived information 11, it may also be duplicated via this likewise visual information channel and additionally presented to driver 1. This is omitted if driver 1 has already perceived information 11.

The information channels are controlled by a regulating and control unit 9. The data concerning the perception, i.e., especially the camera images, may be evaluated by a regulating or control unit, as well. It may be the same or a different regulating and control unit 9. In this context, for example, control unit 9 transmits instructions concerning the HMI adaptation via an interface (e.g., CAN) to the control units of the affected objects (for instance, navigation system, instrument cluster).

FIG. 3 shows a schematic flow chart of the steps of method 10 or 10' according to one exemplary embodiment. Here, in a first step S1, the information is presented to the driver via at least a first information channel. In a second step S2, a perception quantity representing perception by the driver with regard to the information presented is determined. In a third step S3, a transmission of the information via a further information channel is defined on the basis of the perception quantity determined. This third step S3 may be followed by a fourth step S4, which includes the transmission of the information via a further information channel.

What is claimed is:
1. A method for transmitting information to a driver of a motor vehicle, with at least two information channels being provided to transmit information, the method comprising:
presenting the information via at least a first information channel for the driver, the information being presented to the driver via the first information channel as a visual presentation;

determining a perception quantity representing perception by the driver with regard to the information presented as the visual presentation, the perception quantity being determined based on a length of time a gaze of the driver stays on the visual presentation; and presenting the information via a further information channel on the basis of the perception quantity determined, the further information channel being different than the first information channel.

2. The method as recited in claim 1, wherein the first information channel is in the form of a first visual information-transmitting location.

3. The method as recited in claim 1, wherein the further information channel is implemented at least one of: an auditory information-transmitting location, a second visual information-transmitting location, and a haptic information-transmitting location.

4. The method as recited in claim 1, the method further comprising:
    determining that the perception quantity represents perception of the information by the driver; and
    based on the determination that the perception quantity represents perception of the information by the driver, adapting a transmission of the information via the further information channel, the adapting including attenuating a presentation of the information.

5. The method as recited in claim 4, wherein the determining that the perception quantity represents the perception of the information by the driver take place when the length of time the gaze of the driver stays on the visual presentation is greater than or equal to 1 second.

6. The method as recited in claim 1, the method further comprising:
    determining that the perception quantity represents no perception of the information by the driver; and
    based on the determination that the perception quantify represents no perception of the information by the driver, adapting a transmission of the information via the further information channel, the adapting including amplifying a presentation of the information.

7. The method as recited in claim 1, wherein at least one of the following factors is taken into account in ascertaining the perception quantity:
    a viewing direction of the driver, and
    an action by the driver.

8. The method as recited in claim 1, wherein the perception quantity is determined with the aid of a passenger-compartment sensor system including a passenger-compartment camera.

9. The method as recited in claim 1, wherein the further information channel is an auditory information channel via which the driver is presented the information using a loudspeaker.

10. The method as recited in claim 1, wherein the further information channel is a haptic information channel via which the driver is presented the information using steering-wheel vibrations.

11. A method for controlling a driver assistance system, including transmission of information to a driver of a motor vehicle, at least two information channels being provided for transmitting information, comprising:
    presenting the information via at least a first information channel for the driver, the information being presented to the driver via the first information channel as a visual presentation;
    determining a perception quantity representing perception by the driver with regard to the information presented as the visual presentation, the perception quantity being determined based on a length of time a gaze of the driver stays on the visual presentation; and
    presenting the information via a further information channel on the basis of the perception quantity determined, the further information channel being different than the first information channel.

12. The method as recited in claim 11, wherein the further information channel is an auditory information channel via which the driver is presented the information using a loudspeaker.

13. The method as recited in claim 11, wherein the further information channel is a haptic information channel via which the driver is presented the information using steering-wheel vibrations.

14. An apparatus for transmitting information to a driver of a motor vehicle, with at least two information channels being provided to transmit information, the apparatus designed to:
    present the information via at least a first information channel for the driver, the information being presented to the driver via the first information channel as a visual presentation;
    determine a perception quantity representing perception by the driver with regard to the information presented as the visual presentation, the perception quantity being determined based on a length of time a gaze of the driver stays on the visual presentation; and
    present the information via a further information channel on the basis of the perception quantity determined, the further information channel being different than the first information channel.

15. The apparatus as recited in claim 14, wherein the further information channel is an auditory information channel via which the driver is presented the information using a loudspeaker.

16. The apparatus as recited in claim 14, wherein the further information channel is a haptic information channel via which the driver is presented the information using steering-wheel vibrations.

17. A non-transitory machine-readable storage medium, on which is stored a computer program for transmitting information to a driver of a motor vehicle, with at least two information channels being provided to transmit information, the computer program, when executed by a computer, causing the computer to perform:
    presenting the information via at least a first information channel for the driver, the information being presented to the driver via the first information channel as a visual presentation;
    determining a perception quantity representing perception by the driver with regard to the information presented as the visual presentation, the perception quantity being determined based on a length of time a gaze of the driver stays on the visual presentation; and
    presenting the information via a further information channel on the basis of the perception quantity determined, the further information channel being different than the first information channel.

18. The non-transitory machine-readable storage medium as recited in claim 17, wherein the further information channel is an auditory information channel via which the driver is presented the information using a loudspeaker.

19. The non-transitory machine-readable storage medium as recited in claim 17, wherein the further information channel is a haptic information channel via which the driver is presented the information using steering-wheel vibrations.

* * * * *